T. R. McKNIGHT.
GRADING MACHINE.
APPLICATION FILED JULY 15, 1908.
981,781.
Patented Jan. 17, 1911.
6 SHEETS—SHEET 2.
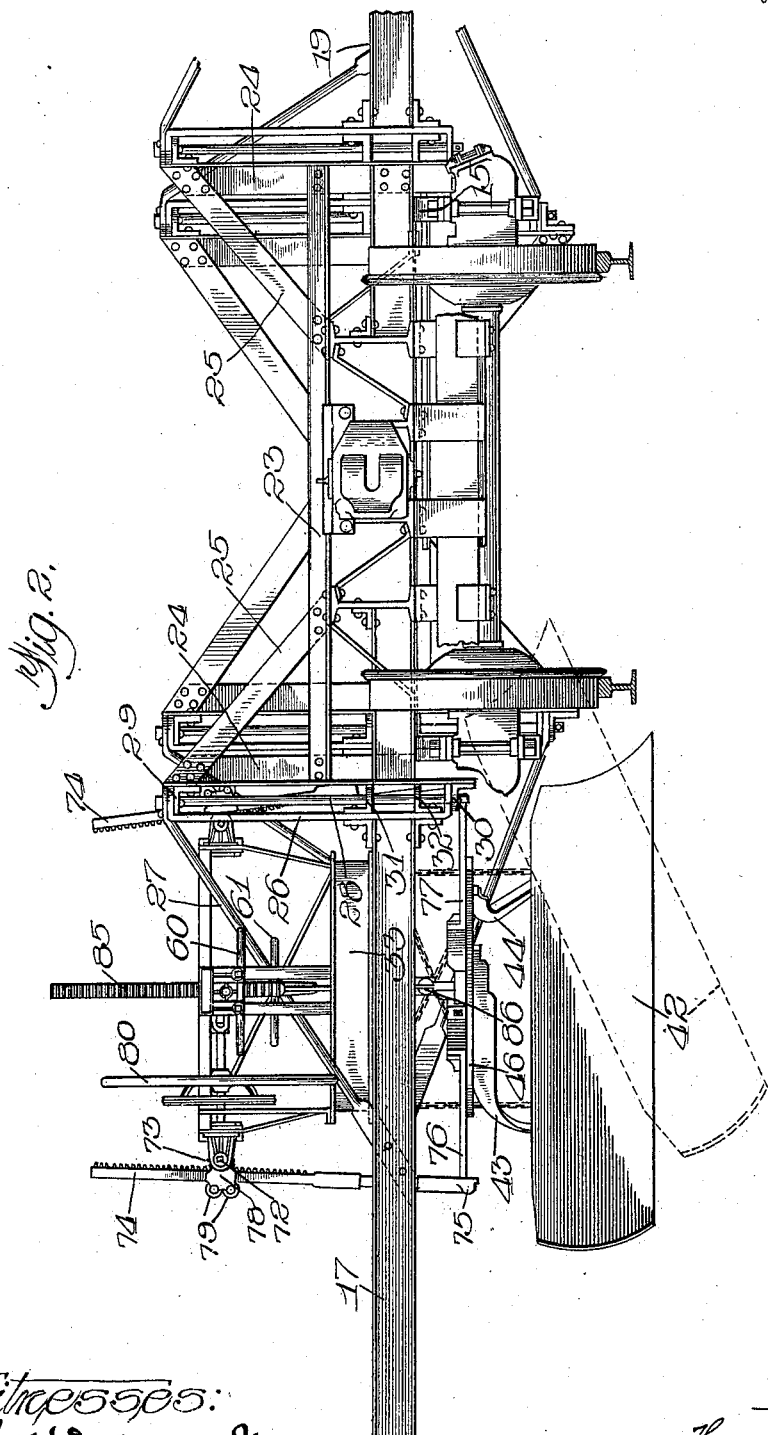

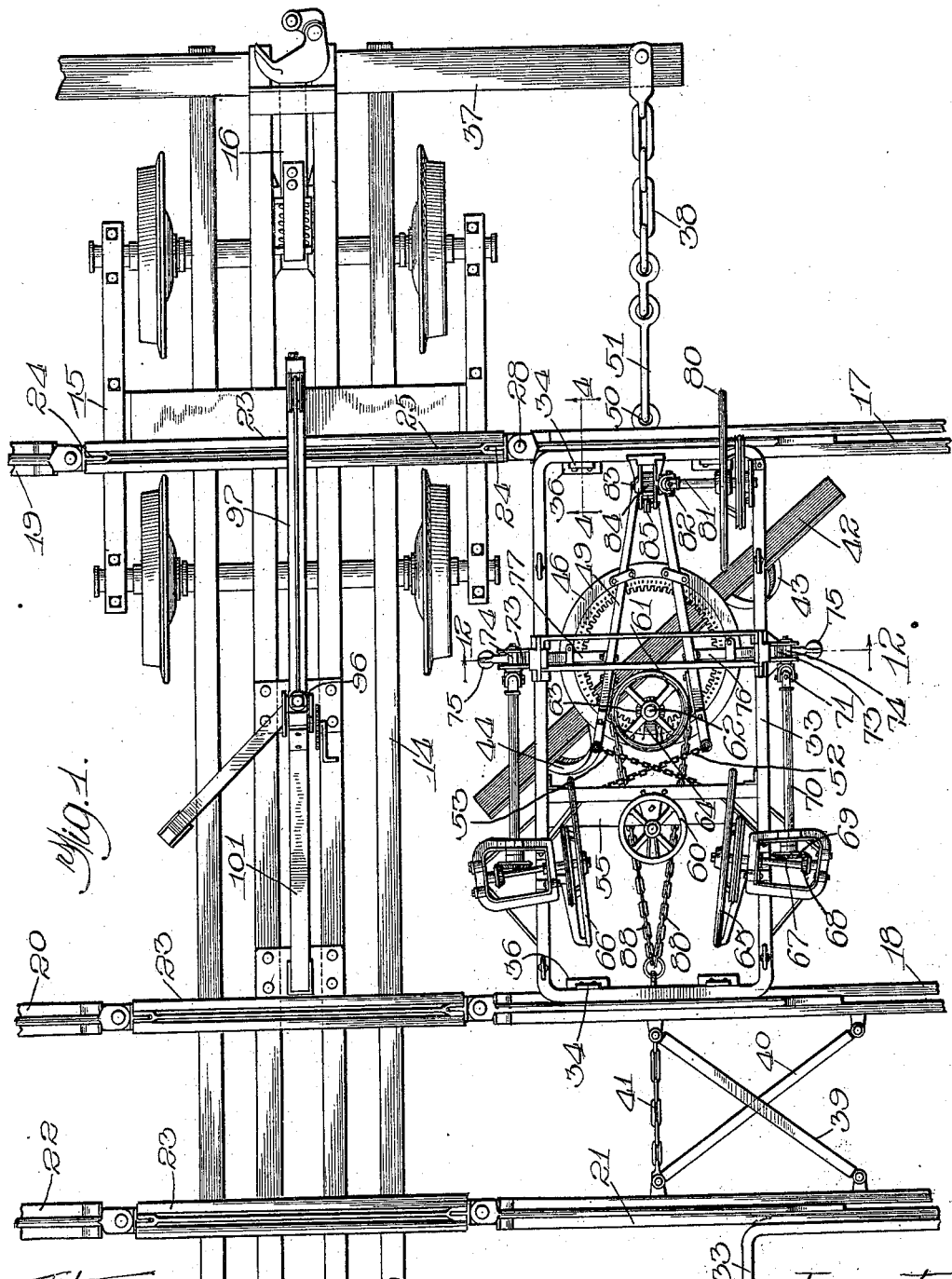

T. R. McKNIGHT.
GRADING MACHINE.
APPLICATION FILED JULY 15, 1908.
981,781.
Patented Jan. 17, 1911.
6 SHEETS—SHEET 3.
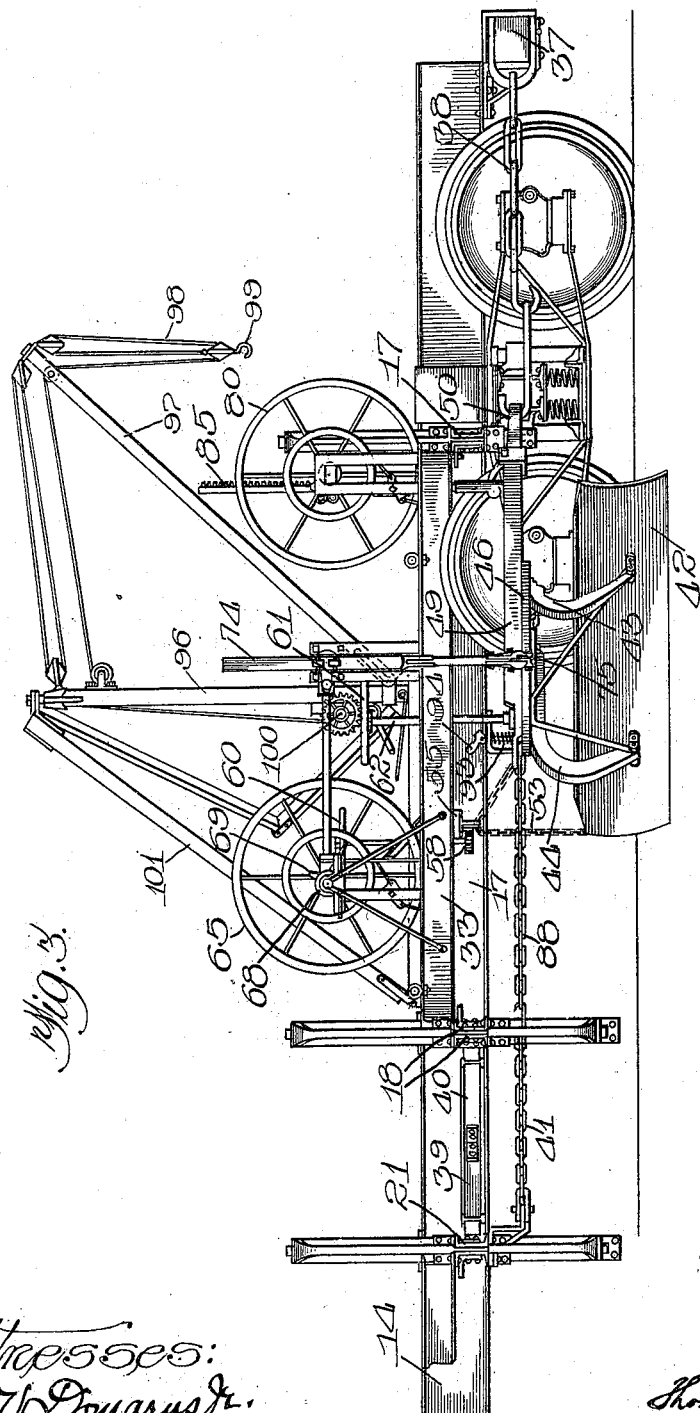
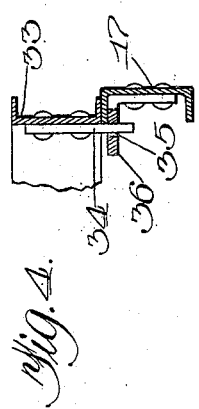

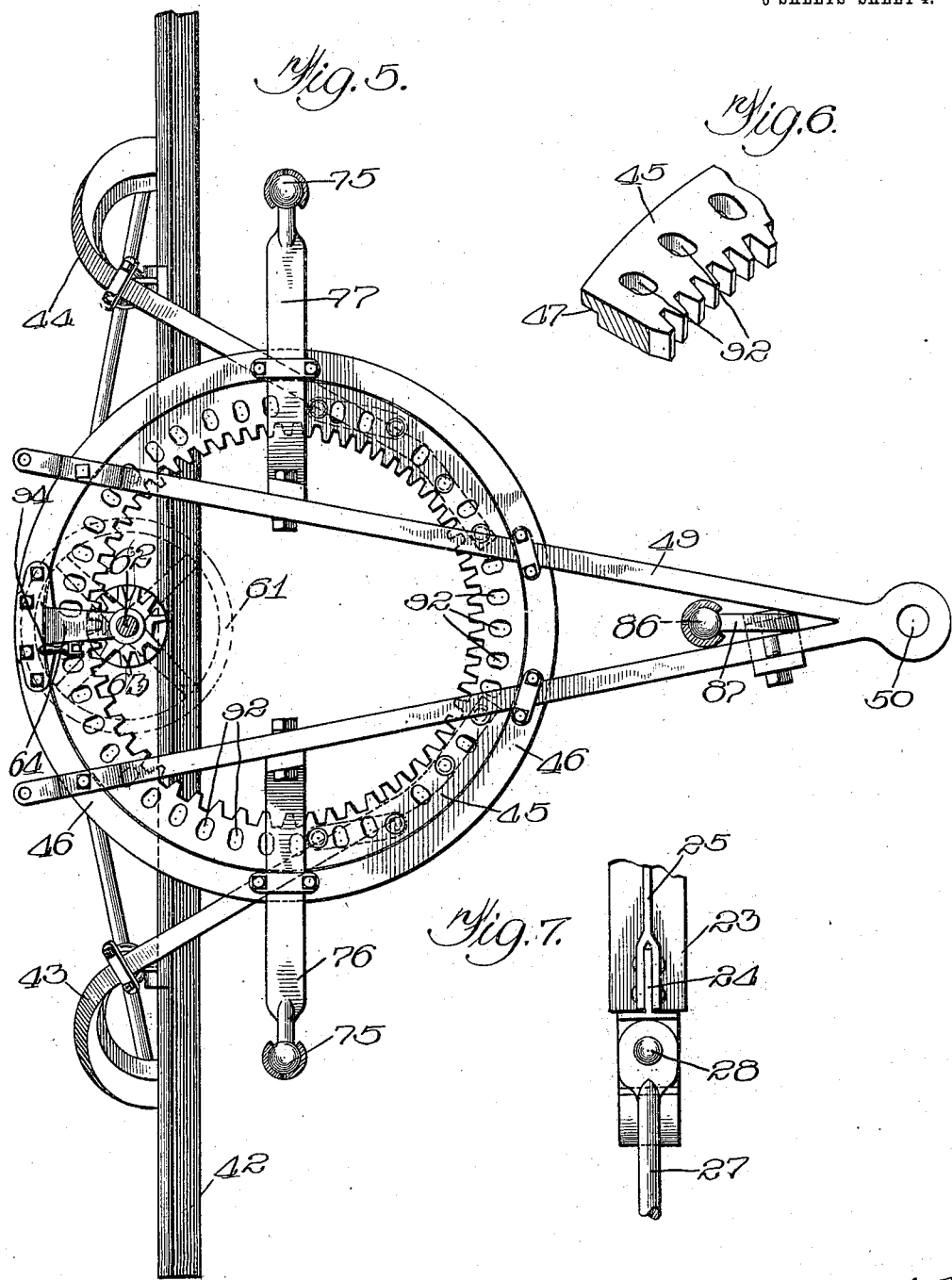

T. R. McKNIGHT.
GRADING MACHINE.
APPLICATION FILED JULY 15, 1908.
981,781.
Patented Jan. 17, 1911.
6 SHEETS—SHEET 5.
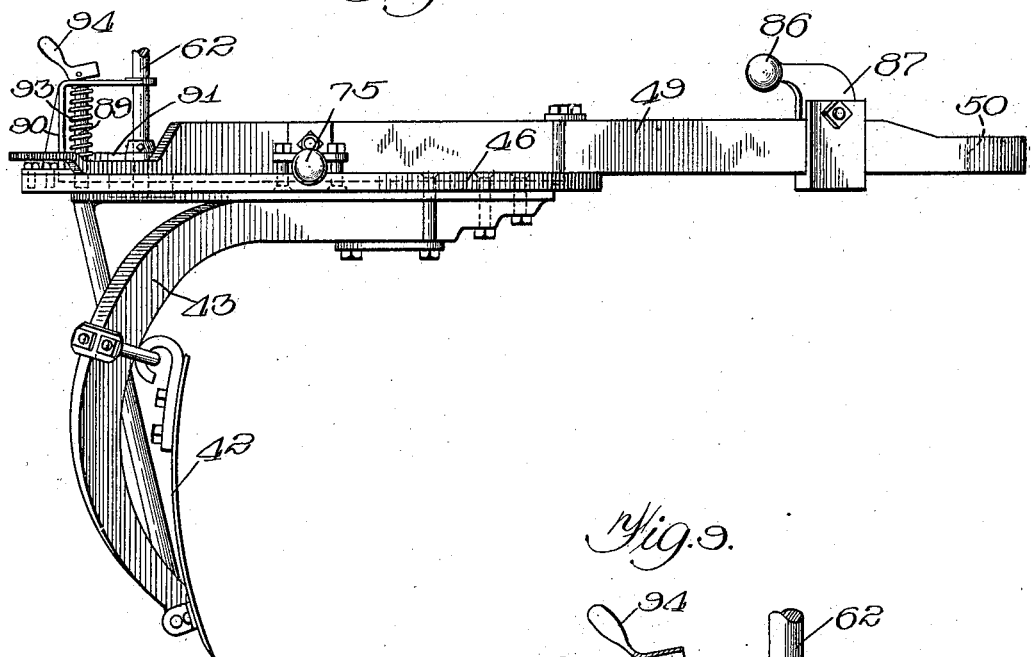
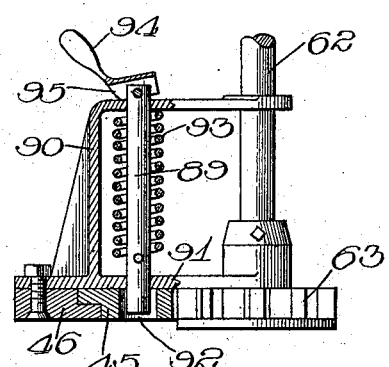
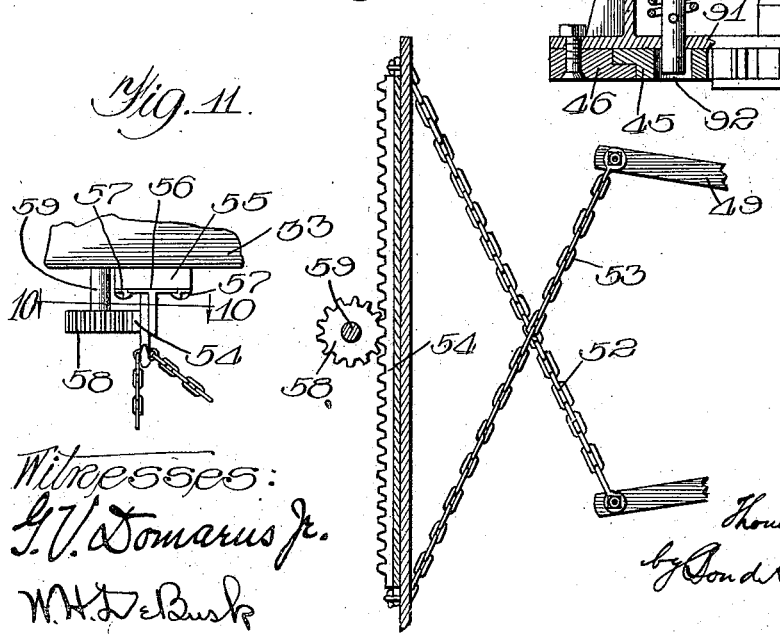
Witnesses:
G. V. Domarus Jr.
W. H. DeBusk
Inventor:
Thomas R. McKnight,
by Bond Adams Pickard Jackson
his Attys.

T. R. McKNIGHT.
GRADING MACHINE.
APPLICATION FILED JULY 15, 1908.
981,781.
Patented Jan. 17, 1911.
6 SHEETS—SHEET 6.
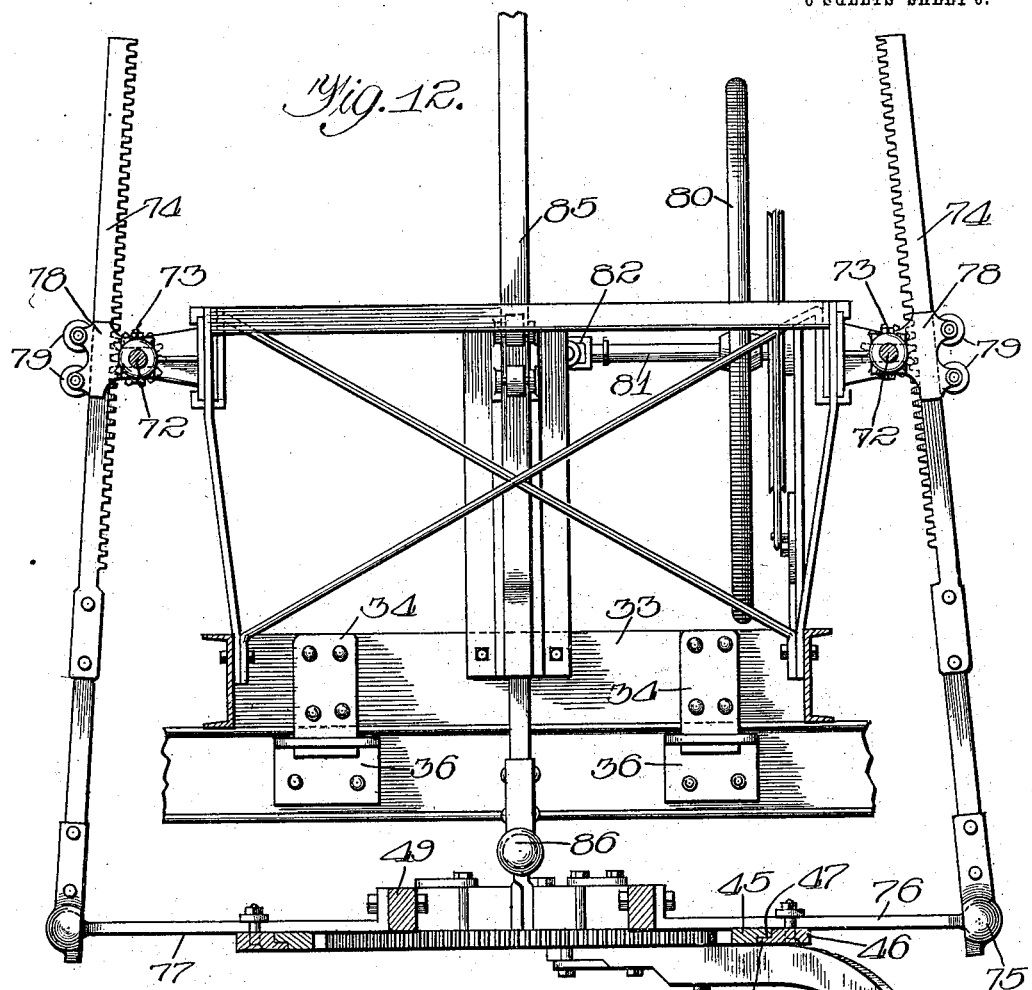

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

GRADING-MACHINE.

981,781.  Specification of Letters Patent.  Patented Jan. 17, 1911.

Application filed July 15, 1908.  Serial No. 443,684.

*To all whom it may concern:*

Be it known that I, THOMAS R. MCKNIGHT, a citizen of the United States, residing at Aurora, in the county of Kane and State of Illinois, have invented certain new and useful Improvements in Grading-Machines, of which the following is a specification, reference being had to the accompanying drawings.

My invention relates to grading machinery, and has particularly to do with grading machines for railway use.

It has for its object to provide a new and improved machine in the nature of a car provided with means for grading or ditching at either side of a railway track over which the car runs, and also to provide a construction by which the grading or leveling devices may be reversed so that the car may be operated in either direction.

A further object is to provide a car with grading devices at one or both sides so mounted as to be capable of being removed and deposited upon the car for transportation purposes, and to provide mechanism by which the grading devices may be conveniently and easily handled.

I accomplish these objects by the means shown in the drawings and hereinafter specifically described.

That which I believe to be new is pointed out in the claims.

In the accompanying drawings:—Figure 1 is a plan view illustrating a part of my improved car. Fig. 2 is a front elevation of the parts shown in Fig. 1. Fig. 3 is a side view of the parts shown in Fig. 1. Fig. 4 is an enlarged detail, being a vertical section on line 4—4 of Fig. 1. Fig. 5 is an enlarged detail, being a plan view of the scraper-blade and the supporting devices therefor. Fig. 6 is a perspective view, showing the construction of the annular rack by which the scraper-blade is angularly adjusted. Fig. 7 is an enlarged detail, being a plan view, showing the manner in which the lateral scraper-frame-supporting arms are connected with the car. Fig. 8 is a side elevation of the scraper and the devices which immediately support it. Fig. 9 is an enlarged detail, showing the locking device by which the scraper-blade is secured in different positions of adjustment. Fig. 10 is a sectional view taken on line 10—10 of Fig. 11, showing the devices for laterally adjusting the scraper-blade. Fig. 11 is an end view of certain parts shown in Fig. 10. Fig. 12 is a cross section on line 12—12 of Fig. 1. Fig. 13 is a side view of the parts shown in Fig. 7.

Referring now to Fig. 1, which shows somewhat more than one-half of the car frame, together with the scraper carried at one side thereof, it should be explained that the complete car is equipped with four scraper-frames and scrapers, two at each side, all of said scraper-frames and scrapers, however, being of the same kind and mounted in the same way, so that the illustration of the one will suffice to fully show the construction. As therein illustrated, 14 indicates the frame of the car, 15 one of the trucks, and 16 the coupler at one end of the car. 17—18 indicate the members of a pair of scraper-frame supporting arms which at their inner ends are secured to the car-frame and project laterally therefrom. Said arms are parallel with each other and are separated by a distance substantially equal to the length of the scraper-frame, as shown in Fig. 1. 19—20 indicate corresponding members of a pair of similar arms at the other side of the car, and 21—22 indicate the inner members of similar pairs of arms at the other end of the car, said arms 21—22 corresponding with the arms 18—20. The several laterally-projecting arms are pivotally secured to the end portions of transverse bars 23 which are fixedly secured to the car-frame at suitable intervals, as shown in Fig. 1.

The construction by which the several laterally-projecting arms are pivotally connected with the car-frame is best shown in Figs. 1, 2 and 13, from which it will be seen that uprights 24 are provided at the ends of the transverse bars 23, said uprights being secured between their ends to said transverse bars 23 and at their lower ends being connected with the car-frame. Braces 25 connect the upper ends of said uprights with the transverse bars 23, as shown in Fig. 2. The laterally-projecting arms 17—18, and the other corresponding arms, are also provided with uprights 26 at their inner ends, said uprights being braced by brace-rods 27, as shown in Fig. 2. The ends of the uprights 26 are bent at right-angles so as to lie horizontally and are perforated to receive a pivot rod 28 which passes through the bent ends of said uprights and through perforated bearing plates 29—30 secured to the upper and lower ends of the uprights 24, as shown in Fig. 2. These parts therefore coöperate to form a hinge by which the laterally-extending arms are pivotally connected with the car-frame so as to be capable of swinging laterally in a substantially horizontal plane turning about the pivot rod 28 as a center. To strengthen this hinged connection, the uprights 26 are provided with horizontal ears 31—32 which project laterally therefrom registering with the bent ends thereof and which are perforated to receive the pivot rod 28. The outer ends of the ears 31—32 are rounded so that they do not interfere with the swinging of the laterally-projecting arms. Preferably the pivots for the laterally-projecting arms which support the inner ends of the scraper-frames are set nearer the car-frame, as clearly shown in Figs. 1 and 2.

33 indicates one of the scraper-frames which are supported by the pairs of laterally-projecting arms. Said scraper-frames, as shown in Fig. 1, are rectangular in shape, preferably being made of channel-iron, as shown in Fig. 4. They are adapted to rest upon the flanges of the laterally-projecting arms which are also preferably made of channel-iron, and are secured to said arms by downwardly-projecting plates 34 which fit into slots 35 in ears 36 secured to said laterally-projecting arms, as 17, the arrangement being practically a dowel-pin connection. Two of the connecting plates 34 are preferably provided at each end of the scraper-frames, and the laterally-projecting arms may be provided with any desired number of ears 36 so that the scraper-frames may be set at different distances from the car-frame. In Fig. 1, I have illustrated a part of a second scraper-frame 33 as resting upon the laterally-projecting arm 21 at a greater distance from the car-frame than the scraper-frame shown in full. This will serve to illustrate the manner in which the two scraper-frames at one side of the car may be set so as to coöperate to scrape a strip of ground of greater width.

At each end of the car is provided a transversely-disposed draft-bar 37, the ends of which project laterally in front of the laterally-projecting scraper-frame-supporting arms, as shown in Fig. 1, and which are connected therewith by chains 38. Also the inner scraper-frame-supporting arms are connected by cross-braces 39—40 and chains 41, as shown in Fig. 1. These several braces are detachable, so that they may be readily disengaged.

The scraper-frame and the parts carried thereby are best shown in Figs. 1, 5, 8 and 12. The scraper-blade 42 is supported below the frame 33 by means of beams 43—44 which extend forward of the blade and are connected at their front ends to an annular rack 45 which is fitted within a stationary ring 46, as shown in Figs. 5 and 12. As best shown in Fig. 12, the annular rack 45 is provided with teeth on its inner margin, its outer margin having a flange 47 which overlies a flange 48 at the inner margin of the ring 46. Thus the flange 48 forms a support for the annular rack 45, on which the latter may rotate. The beams 43—44 being rigidly connected to the rack 45, obviously by rotating said rack the angular position of the blade may be changed. The ring 46 is connected to a V-shaped frame or beam 49 the apex of which is connected with the draft-chain 38, being provided with an eye 50 at its forward end adapted to receive a hook 51 at the rear end of the chain 38, as shown in Figs. 1 and 3. The separated rear ends of the beam 49 are connected by chains 52—53, respectively, with the end portions of a rack-bar 54, best shown in Fig. 10, said rack-bar being supported by a cross-bar 55 extending transversely of the scraper-supporting frame 33, as shown in Figs. 1 and 11. The rack-bar 54 may be connected with the scraper-frame in any suitable way, provided endwise movement thereof is permitted, but I prefer to employ the construction shown in Fig. 11, in which said bar is connected with a T-beam 56 arranged to slide between guides 57 which also are connected with the cross-bar 55. The rack-bar 54 is moved endwise by means of a pinion 58 which meshes therewith and is carried at the lower end of a shaft 59 provided with a hand-wheel 60, as shown in Figs. 1 and 11. Thus by rotating the hand-wheel 60, the rack-bar 54 may be moved endwise transversely of the scraper-supporting-frame, thereby carrying the rear ends of the beam 49 to one side or the other and moving the scraper with the supporting devices therefor bodily to one side or the other toward or from the car-frame. The angular position of the scraper-blade is varied as desired by means of a hand-wheel 61 mounted on a vertical shaft 62 which carries a pinion 63 at its lower end. As best shown in Fig. 5, said pinion meshes with the annular rack 45, so that by rotating the hand-wheel 61 the angle of the blade may be changed as desired, or it may be swung entirely around so as to be in position to operate in the reverse direction. 64 indicates a bracket which guides and supports the lower end of the shaft 62, said bracket being secured to the stationary ring 46, as shown in Fig. 5. The stationary ring 46 with the blade and other parts carried thereby may be raised and lowered by means of hand-wheels 65—66, one of said wheels being connected with one side of the ring and the other with the other. As shown in Fig.

1, the hand-wheel 65 is mounted on the horizontal shaft 67 which carries a pinion 68, the latter meshing with a gear 69 mounted on the longitudinally-extending shaft 70 which is connected by means of a universal joint 71 with a stud 72 which carries a pinion 73, the latter meshing with a rack-bar 74 vertically-disposed and connected at its lower end preferably by a ball and socket joint 75 with an arm 76 which is connected to and extends laterally from the stationary ring 46, as is best shown in Figs. 5 and 12. The hand-wheel 66 is connected in a similar way with a laterally-projecting arm 77 at the opposite side of the ring 46. The connections being the same, they are indicated by the same reference numerals. 78 indicates brackets which embrace the rack-bars 74 and guide them. They also serve to hold said rack-bars in mesh with the pinions 73, as shown in Fig. 12. 79 indicates anti-friction rollers carried by the brackets 78. By the construction shown, the scraper-blade may be raised and lowered as desired, either side being raised or lowered independently of the other. The pitch of the scraper-blade is varied by raising or lowering the front end of the forked-beam 49, this being effected by means of a hand-wheel 80 mounted on a transverse shaft 81 and connected by universal joint 82 with a stud 83 carrying the pinion 84, the latter meshing with a rack-bar 85 similar to the rack-bar 74, and connected preferably by a ball and socket joint 86 with an arm 87 secured at the front end of the frame 49, as best shown in Fig. 5. By raising or lowering the rack-bar 85, the height of the front end of the frame 49 is varied, and consequently the pitch of the scraper-blade altered. 88 indicates chains which connect the rear portion of the ring 46 with the rear portion of the blade-supporting frame 33, thus serving to hold the ring 46 and the parts carried thereby steady while in operation. 89 indicates a locking pin for locking the annular rack 45 against rotation, said pin being mounted in a bracket 90 secured to the stationary rack 46, as shown in Fig. 9, and being adapted to project through a hole in the lower portion of said bracket and a registering hole 92 in the rack 45. A number of holes 92 are provided so that the rack 45 may be locked in a number of different positions. A spring 93 serves to force the pin 89 downward into operative position. It is moved out of operative position to release the rack 45 by a cam-lever 94 pivoted upon the upper end of the pin 89 above the bracket 90 and having a cam portion 95 which bears upon the upper end of the bracket in such manner that when depressed it will operate to draw the pin 89 upward and release the rack 45.

Fig. 1 shows one of the scraper-frames and blades in operative position. When any scraper-frame is not to be used it may be removed and deposited upon the car-frame by simply lifting it out of engagement with the laterally-projecting arms 17—18, or the corresponding arms at the other portions of the car-frame. To facilitate this operation, a crane of any suitable type is provided on the car-frame. In Fig. 3 I have illustrated one form of crane suitable for this purpose, the same comprising a mast 96 pivoted to swing upon the car-frame into position to engage the scraper-frame at either side thereof and having a beam 97 provided with suitable blocks through which runs a hoisting rope 98 having a hook 99 or other suitable means for engaging the scraper-frame. A windlass 100 of any suitable type is provided for operating the hoisting rope. 101 indicates a brace for the mast.

From the foregoing description, it will be seen that any one of the scraper-frames may readily be put in place or removed and deposited on the car-frame, or, if desired, a scraper-frame may be transferred from one side of the car to the other. Furthermore, the scraping devices carried by any scraper-frame may be adjusted so as to operate by the movement of the car in either direction, or to move the material either toward or from the car or railway. Moreover, the scraper-frames may be set a greater or less distance from the car-frame. My improved grading machine is therefore well adapted for use under a variety of conditions.

What I claim as my invention and desire to secure by Letters Patent is,—

1. A grading machine, comprising a car-frame mounted on wheels adapted to run on a track, a pair of arms connected with said car-frame and projecting laterally at one side thereof, said arms being a distance apart, a scraper-frame connected with said arms, and reversible scraping means carried by said scraper-frame.

2. A grading machine, comprising a car-frame mounted on wheels adapted to run on a track, a pair of arms pivotally connected with said car-frame to swing in a substantially horizontal plane and projecting laterally at one side thereof, said arms being a distance apart, a scraper-frame connected with said arms, and scraping means carried by said scraper-frame.

3. A grading machine, comprising a car-frame mounted on wheels adapted to run on a track, a pair of arms connected with said car-frame and projecting laterally at one side thereof, said arms being a distance apart, a scraper-frame connected with said arms, scraping means carried by said scraper-frame, and a draft-bar projecting laterally at one end of the car-frame and connected with the adjacent arm.

4. A grading machine, comprising a car-frame mounted on wheels adapted to run on a track, a pair of arms connected with said car-frame and projecting laterally at one side thereof, said arms being a distance apart, a scraper-frame connected with said arms and adjustable longitudinally thereof toward and from the car-frame, and scraping means carried by said scraper-frame.

5. A grading machine, comprising a car-frame mounted on wheels adapted to run on a track, a plurality of pairs of laterally-projecting arms carried thereby at one side thereof, the inner arms of each pair being connected together, scraper-frames carried by said pairs of arms, and scraping means carried by said scraper-frames.

6. A grading machine, comprising a car-frame mounted on wheels adapted to run on a track, a plurality of pairs of laterally-projecting arms carried thereby at one side thereof, the inner arms of each pair being connected together, scraper-frames carried by said pairs of arms, scraping means carried by said scraper-frames, and draft-beams at the ends of the car-frame and projecting laterally in front of said arms, said draft-beams being connected with the adjacent arms.

7. A grading machine, comprising a car-frame mounted on wheels adapted to run on a track, supporting devices projecting laterally at one side of the car-frame and pivoted to swing in a substantially horizontal plane, a scraper-frame carried by said supporting devices, and scraping means and mechanism for adjusting the same carried by said scraper-frame.

8. A grading machine, comprising a car-frame mounted on wheels adapted to run on a track, supporting devices projecting laterally at one side of the car-frame, a scraper-frame carried by said supporting devices, and scraping means and mechanism for adjusting the same carried by said scraper-frame, said scraping means being reversible so that it may be employed when the car is moved in either direction.

9. A grading machine, comprising a car-frame mounted on wheels adapted to run on a track, a pair of arms pivotally connected at one side of said car-frame and projecting laterally therefrom, said arms being a distance apart, a scraper-frame connected with said arms and movable longitudinally thereof, and scraping means carried by said scraper-frame.

10. A grading machine, comprising a car-frame mounted on wheels adapted to run on a track, a pair of arms pivotally connected with said car-frame at one side thereof and adapted to swing in a horizontal plane at one side thereof, said arms being a distance apart, a scraper-frame connected with said arms, and scraping means carried by said scraper-frame.

11. A grading machine, comprising a car-frame mounted on wheels adapted to run on a track, a pair of arms pivotally connected with said car-frame at one side thereof and adapted to swing in a horizontal plane at one side thereof, said arms being a distance apart, a scraper-frame connected with said arms and adjustable longitudinally thereof, and scraping means carried by said scraper frame.

12. A grading machine, comprising a car-frame mounted on wheels adapted to run on a track, a pair of arms pivotally connected at one side with said car-frame and projecting laterally therefrom, said arms being a distance apart, a scraper-frame connected with said arms, scraping means carried by said scraper-frame, and draft-devices connected with said arms.

13. A grading machine, comprising a car-frame mounted on wheels adapted to run on a track, a pair of arms pivotally connected with said car-frame at one side thereof and adapted to swing in a horizontal plane at one side thereof, said arms being a distance apart, a scraper-frame connected with said arms, scraping means carried by said scraper-frame, and draft-devices connected with said arms.

THOMAS R. McKNIGHT.

Witnesses:
MILES T. BABB,
FRANCES B. FLYNN.